United States Patent [19]

Harvey

[11] 4,334,753
[45] Jun. 15, 1982

[54] CAMERA WITH FILM THREAD INDICATING MECHANISM

[75] Inventor: Donald M. Harvey, Webster, N.Y.

[73] Assignee: Eastman Kodak Company, Rochester, N.Y.

[21] Appl. No.: 264,304

[22] Filed: May 18, 1981

[51] Int. Cl.³ .......................... G03B 17/00; G03B 1/00
[52] U.S. Cl. ...................................... 354/289; 354/212
[58] Field of Search .............. 242/71.1; 354/217, 218, 354/288, 289, 275, 203, 53, 212–215, 152 VS, 268

[56] References Cited

U.S. PATENT DOCUMENTS

| 1,389,164 | 8/1921 | Roikjer | 354/212 |
| 2,766,669 | 10/1956 | Weisse et al. | 354/152 VS UX |
| 4,104,664 | 8/1978 | Winkler et al. | 354/275 X |
| 4,134,657 | 1/1979 | Nomura | 354/218 X |
| 4,176,927 | 12/1979 | Wagensonner | 354/289 X |

FOREIGN PATENT DOCUMENTS 1109327  4/1968  United Kingdom ................ 354/212

Primary Examiner—Donald Griffin
Attorney, Agent, or Firm—Douglas I. Hague

[57] ABSTRACT

A unitary, movable lever permits a photographic camera to be test operated in the absence of film and, when the camera is loaded with film, permits an exposure to be initiated only if the film has been properly threaded and advanced. With no film in the camera, the lever is urged to a first position which permits actuation of the shutter. When the camera is initially loaded with film, a sensing pin engages an edge of a laterally trimmed film leader and moves the lever to a second position in which it blocks actuation of the shutter and provides a visual indication of the blockage in the camera viewfinder. If the film is properly attached to the take-up spool and advanced a sufficient distance, a widening portion of the leader, adjacent the full-width of the light sensitive film portion moves past the sensing pin. The sensing pin is moved by the widening leader thereby causing the lever to move to a third position in which it again permits actuation of the shutter.

2 Claims, 3 Drawing Figures

CAMERA WITH FILM THREAD INDICATING MECHANISM

FIELD OF THE INVENTION

The present invention relates to photographic cameras. In particular, the present invention relates to mechanisms which permit a camera; (1) when loaded with film, to initiate an exposure only if certain criteria are met in the process of film advancement, and (2) when not loaded with film, to be test-operated.

BACKGROUND OF THE INVENTION

To manually load most modern 35 mm cameras with film, a film leader is pulled out of a cassette, perforations located along at least one marginal edge of the leader are engaged with a metering sprocket and the free end of the leader is attached to a take-up spool located in a take-up chamber. The back cover of the camera is then closed and an initial film-winding operation is carried out by operating a winding lever and depressing a shutter release button several times until the first effective frame area of the film is in the proper position for exposure. Subsequent exposures are made by successively repeating the film winding and shutter releasing operations.

The metering sprocket is driven through one complete rotation by each actuation of the winding lever. During such rotation, the sprocket operates to recock the shutter and disable the shutter release button until the sprocket has completed its rotation, thus, preventing accidental exposure of the film prior to completion of its advancement.

One disadvantage of the aforementioned 35 mm loading mechanisms is that their complexity makes it difficult for many amateur camera operators to load 35 mm film properly. In some instances even though the camera operator believes that he has properly attached the free end of the leader to the take-up spool, the leader disengages from the spool after the camera back is closed. However, once the camera back is closed, improper film threading cannot readily be detected from outside the camera because the winding lever and shutter release button can operate in the usual way. The operator thus, under the delusion that the camera is working properly, learns of the film loading problem only when the film is developed.

U.S. Pat. No. 3,665,830 to Maeda discloses a 35 mm film transport mechanism having a first detection mechanism which detects whether or not the film is being wound on a take-up spool. The detection mechanism is associated with a release-button locking mechanism and a film-transport blocking mechanism so that until a predetermined amount of film has been wound on the take-up spool from a starting position, the film can be advanced without releasing the shutter. Upon detecting the winding of a predetermined amount of film, the film-transport blocking mechanism is enabled to block the film-winding operation and the release-button locking mechanism is freed from its retained position. Normal release-button locking and film-transport locking operations can then be effected. Also mounted in the camera is a second detection mechanism actuated upon detecting the loading of a film magazine. This detection mechanism is constructed such that when a film magazine is not loaded, the film-transport blocking mechanism and the release-button locking mechanism are allowed to function normally. Thus, by operating the winding lever, the shutter is freed to be released. Upon detecting the loading of a magazine, the second detection mechanism is released from the film-winding mechanism and the operation of the release-button locking means and the film-transport blocking means is controlled by the first detecting mechanism. The magazine detection mechanism allows test operation of the camera without film, which is desireable (1) during camera manufacture to check its accuracy, (2) in a store demonstration prior to sale to illustrate the camera's features, and (3) for re-familiarization by the owner/operator after the camera has not been used for a prolonged period.

The Maeda film transport mechanism permits the camera operator to determine from outside the camera whether or not the film threading operation has been properly completed, while enabling test operation of the camera in the absence of film. However, this capability is achieved in Maeda by separate film-magazine and film-advancement detecting elements interconnected by a complex arrangement of cams, levers and springs.

It is well known to provide cartridge loaded cameras, (e.g. a camera using 110 or 126 size film cartridges), with mechanisms which permit test operation when there is no film in the camera, and which block the shutter operation when the camera is loaded with film until the film is advanced to a proper position for exposure. An example of such a mechanism is shown in U.S. Pat. No. 3,675,556 to Rigolini. Such mechanisms, however, can be inherently simpler than their 35 mm counterparts, because, in film cartridges, the film is permanently attached to a take-up spool and the film is provided with metering perforations associated with respective exposure areas at predetermined locations along the film strip.

SUMMARY OF THE INVENTION

The present invention provides a simple, reliable and economical apparatus that senses (1) the absence of an unused 35 mm cassette in the camera, (2) the initial loading of an unused 35 mm cassette in the camera, and (3) the proper completion of the film-threading operation. Normal camera operation is permitted when conditions (1) and (3) above are sensed and camera operation is blocked and the blockage indicated to the operator when condition (2) is sensed. In a preferred embodiment of the invention, a camera is adapted for use with a film cassette containing an elongated roll of film having a full-width light-sensitive portion and a narrower leader portion. The camera has a movable detecting lever having a sensing element extending into a film passageway between film supply and take up chambers and a blocking element located adjacent a shutter release mechanism. A spring resiliently urges the detecting lever in a first direction so that, in the absence of film in the camera, the detecting lever is moved to a first position in which the blocking element permits actuation of the shutter. When the camera is loaded with a film cassette and the leader portion of the film is located in the film passageway, an edge of the laterally trimmed film leader engages the sensing element and moves the detecting lever in a second direction, against the bias of the spring, to a second position in which the blocking element prevents actuation of the shutter. When the loading procedure is being completed and film is being properly advanced into the take-up chamber, the sensing element follows a widening leader portion adjacent the light-sensitive portion, and moves the detecting lever in the second direction to a third position in which the lever again permits actuation of the shutter.

The invention and its features and advantages will become more apparent by referring to the accompanying drawing and to the ensuing detailed description of illustrative preferred embodiments.

DETAILED DESCRIPTION OF THE PREFERRED EMBODIMENTS

Because photographic cameras and film cassettes are well known, the present description will be directed in particular to elements forming part of, or cooperating more directly with, apparatus in accordance with the present invention. It is to be understood that camera elements and cassette elements not specifically shown or described may take various forms well known to those having skill in the art.

Figure 1:
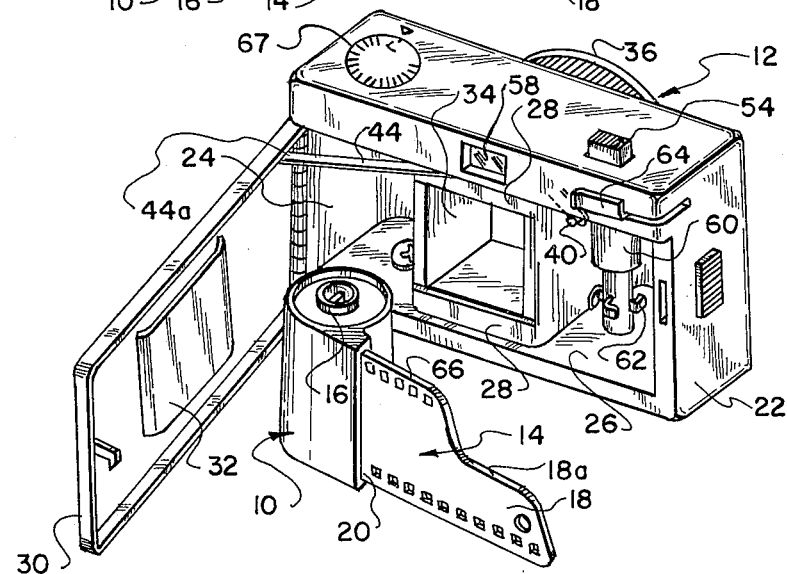
FIG. 1 is a perspective view of a photographic camera incorporating one embodiment of a shutter blocking apparatus according to the invention and of a film cassette for use therein.

FIG. 1 shows a film cassette 10 in position for insertion into a camera 12. The cassette 10 contains an elongated roll of film 14 coiled upon a film spool 16 and having a laterally trimmed leader portion 18 extending through a light-tight slot 20. The camera 12 includes a body portion 22 having a film supply chamber 24 and a film take-up chamber 26 arranged on opposite sides of a pair of film guide supports 28 and a camera door 30 which is hinged to the camera body 22 in a conventional manner. The guide supports 28 cooperate with a pressure plate 32 mounted on the interior of the cover door 30, to define a film passageway 34, extending between the supply and take-up chambers, that maintains the film 14 in a flat, properly oriented position in the focal plane of a camera objective lens 36.

Figure 2:
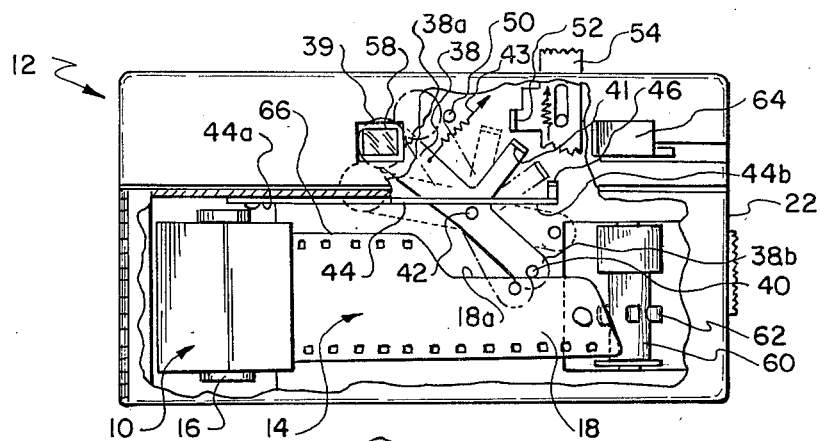
FIG. 2 is a rear elevational view of the camera shown in FIG. 1, the camera being loaded with film and partially broken away to illustrate the various positions assumed by the film edge detecting lever.

As best shown in FIG. 2, a unitary, film-edge detecting lever 38, has an indicating member 39 and a film sensing pin 40 mounted on its respective ends, 38a and 38b, and a centrally located upstanding blocking finger 41. The lever 38 is pivotally mounted on the camera body 22 by a stud 42 and biased by a spring 43 for rotation about stud 42 in a clockwise direction. A retracting arm 44 is attached at one end 44a to the cover door 30 and moves between a camera open position shown in FIG. 1 and a camera closed position shown in FIG. 2. In the open position, an outwardly extending ear 46, mounted on the free end 44b of the retracting arm 44, engages the blocking finger 41 of the detecting lever 38 and pivots the lever 38 in a counterclockwise direction to the position shown in dashed lines. In this position, the blocking finger 41 is spaced from an abutment 52 provided on a shutter release button 54 (to the left of the abutment in FIG. 2) and the indicating member 39 is spaced from a camera viewfinder 58 (below the viewfinder in FIG. 2). When the cover door 30 is closed, the lever 38 is released by the retracting arm 44 and rotates in a clockwise direction under the urging of spring 43. If there is no film in the film passageway 34, the lever 38 is urged against a stop 50 so that lever end 38b assumes the position in the passageway 34 shown in dashed and dotted lines in FIG. 2. In this position, the blocking finger 41 is also spaced from the abutment 52 (to the right of the abutment in the drawing) and the indicating member 39 is spaced from the viewfinder 58 (above the viewfinder in FIG. 2).

To load the camera 12 with film, the operator inserts a film cassette 10 into the film supply chamber 24 with the narrow film leader 18 lying between the film guide supports 28. The film leader 18 is then delivered either manually or automatically (by means not shown) to a position overlying a take-up spool 60 rotatably mounted in the film take-up chamber 26 and secured to a film receiving member 62 mounted on the periphery of the take-up spool 60. When the cover door 30 is closed and the detecting lever 38 is released by the retracting arm 44, the lever 38 rotates in a clockwise direction until the sensing pin 40 engages the upper lateral edge 18a of the film leader 18. In this position, shown in solid lines in FIG. 2, the blocking finger 41 engages the abutment 52, thereby preventing depression of the shutter release button 54, and the indicating member 39 is located in a position in which it is visible in the camera viewfinder 58.

Typically, the leader portion 18 has a length such that one actuation of the film transport lever 64 will not advance the light-sensitive portion 66 of the film 14 into the film passageway 34 and as a result, the detecting lever 38 will remain in the blocking position preventing depression of the shutter release button 54. Advantageously, therefore, the camera 12 is provided with a mechanism, associated with a film frame counter 67 and activated when the cover door 30 is opened, which temporarily disables a film transport locking mechanism (not shown), thereby permitting free and uninterrupted winding of the film leader. At the completion of the leader winding operation, the film transport locking mechanism is automatically enabled and the shutter cocked in readiness to make an exposure. Leader winding mechanisms are well known in the art and can be either automatic, for example, an electric drive mechanism as desclosed in U.S. Pat. No. 3,878,546, or manual, for example, a cam mechanism as disclosed in U.S. Pat. No. 2,936,687. An automatic leader winding mechanism can be advantageously used in the embodiment shown in FIG. 3 and a manual mechanism advantageously used in the embodiment shown in FIGS. 1 and 2. As these leader winding mechanisms form no part of the present invention they have been omitted from the description and drawings in the interest of clarity and reference to the aforementioned patents should be made if details are desired.

If the above-described film loading procedure is correctly completed so that the light-sensitive portion 66 of the film 14 advances into the film passageway 34, the sensing pin 40 is moved by the transition from the narrow film leader 18 to the wider light sensitive film portion 66 and causes the detecting lever 38 to rotate in a counterclockwise direction about the stud 42 to the position shown in dashed lines in FIG. 2. In this position, which is the same position assumed by the lever 38 when the cover door is moved to its open position, the blocking finger 41 is spaced from the abutment 52 (to the left of the abutment in the drawing) and the indicating member 39 is spaced from the viewfinder 58 (below the viewfinder in the drawing). With this positioning of the detecting lever 38, the camera exposure process can be initiated by depressing the release button 54.

On the other hand, if the film loading procedure is incorrectly completed so that the film 14 does not advance onto the take-up spool 60, the detecting lever 38 will remain in the blocking position. The camera operator is warned of the film loading malfunction by the continued blocking of the shutter release button 54 and by the visual indication in the camera viewfinder 58.

Figure 3:
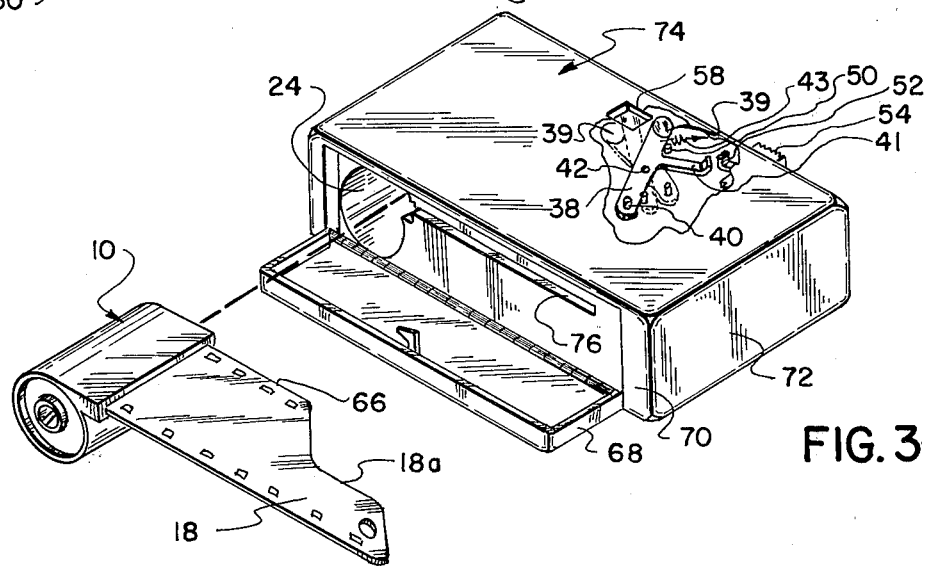
FIG. 3 is a perspective view of a photographic camera incorporating a second embodiment of a shutter blocking apparatus according to the invention and of a film cassette for use therein.

A second embodiment of the invention is shown in FIG. 3 wherein like parts are identified by like reference numerals. In this embodiment, which eliminates the need for a detecting lever retracting arm, the camera cover door 68 is hinged to the bottom wall 70 of the camera body 72. In the absence of film in the camera 74, the spring 43 rotates the detecting lever 38 clockwise about the stud 42 so that the lever 38 is urged against the stop 50 as shown in solid lines. In this position, the blocking finger 41 is spaced from the abutment 52 and the indicating member 39 is spaced from the viewfinder 58.

To load the camera 74 with film, the operator slides a film cassette 10 endwise into a supply chamber 24 and slides the film leader 18 edgewise into a film slot 76. When the cover door 68 is closed, the film leader 18 is pushed upwardly so that the upper lateral edge 18a of the leader engages the sensing pin 40 and rotates the lever 38 in a counterclockwise direction to the position shown in dashed lines in FIG. 3. In this position the blocking finger 41 engages the abutment 52 and the indicating member 39 is visible in the camera viewfinder 58. If the film attaching and advancing procedure, which, in this embodiment is done automatically by means (not shown), successfully completed, the sensing pin 40 is moved by the transition from the narrow film leader 18 to the wider light-sensitive film portion 66 and rotates the lever 38 further in the counterclockwise direction, as shown in dashed and dotted lines, so that the blocking finger 41 is again spaced from the abutment 52 and the indicating member 39 is again spaced from the camera viewfinder 58.

The invention has been described in detail with reference to preferred embodiments thereof, but it will be understood that variations and modifications can be effected within the spirit and scope of the invention.

I claim:

1. In a photographic camera adapted for use with a film cassette containing an elongate strip of roll film having a full-width exposure portion and a narrower leader portion, the camera having a film supply chamber for receiving the film cassette, a film take-up chamber, a film passageway extending between the supply chamber and the take-up chamber, a film transport mechanism for transporting the film through the passageway and into the take-up chamber, and a shutter mechanism for controlling the exposure interval of the film, the improvement comprising:

a moveable detecting member having a sensing element and a blocking element, the detecting member being movable (1) to a first position in which the blocking element permits operation of the shutter mechanism; (2) to a second position determined by the engagement of the sensing element with a lateral edge of the leader portion of a film located in the film passageway, in which second position the blocking element prevents operation of the shutter release mechanism, and; (3) to a third position determined by the engagement of the sensing element with a lateral edge of the exposure portion of a film located in the film passageway, in which third position the blocking element again permits operation of the shutter mechanism; and spring means resiliently urging the detecting member to the first position.

2. A photographic camera adapted for use with a film cassette containing an elongate strip of roll film having a full-width exposure portion and a narrower leader portion, the camera comprising in combination:

a film supply chamber for receiving the cassette;

a film take-up chamber including means for receiving the film;

a film passageway extending between the supply chamber and the take-up chamber;

a film transport mechanism for transporting the film through the passageway and into the take-up chamber;

a shutter mechanism for controlling the exposure interval of the film;

a viewfinder;

a moveable detecting lever having a sensing element, a blocking element and an indicating element; and spring means resiliently urging the detecting lever in a first direction to a first position in which the blocking element permits operation of the shutter mechanism and the indicating element is located at an inactive position in which it is not visible in the viewfinder, the detecting lever being movable in a second direction (1) upon the engagement of the sensing element with a lateral edge of the leader portion of a film located in the film passageway to a second position in which the blocking element prevents operation of the shutter mechanism and the indicating element is located at an active position in which it is visible in the viewfinder, and (2) upon the engagement of the sensing element with a lateral edge of the exposure portion of a film located in the film passageway to a third position in which the blocking element again permits operation of the shutter mechanism and the indicating element is again located at an inactive position.

* * * * *